(12) United States Patent
Kobayashi et al.

(10) Patent No.: US 8,424,205 B2
(45) Date of Patent: Apr. 23, 2013

(54) METHOD FOR MANUFACTURING A BEARING RING MEMBER

(75) Inventors: Kazuto Kobayashi, Kanagawa (JP); Hiroshi Koyama, Kanagawa (JP); Yuu Yasuda, Kanagawa (JP)

(73) Assignee: NSK, Ltd. (JP)

( * ) Notice: Subject to any disclaimer, the term of this patent is extended or adjusted under 35 U.S.C. 154(b) by 760 days.

(21) Appl. No.: 12/523,178

(22) PCT Filed: Jan. 21, 2008

(86) PCT No.: PCT/JP2008/050722
§ 371 (c)(1),
(2), (4) Date: Nov. 2, 2009

(87) PCT Pub. No.: WO2008/090848
PCT Pub. Date: Jul. 31, 2008

(65) Prior Publication Data
US 2010/0058591 A1 Mar. 11, 2010

(30) Foreign Application Priority Data

Jan. 22, 2007 (JP) ................................ 2007-011103

(51) Int. Cl.
*B21D 22/00* (2006.01)
*B21K 1/40* (2006.01)
(52) U.S. Cl.
USPC ...... 29/894.36; 29/898; 29/898.06; 72/353.2; 72/377; 384/544

(58) Field of Classification Search ............... 29/894.36, 29/894.362; 72/187, 381, 353.2, 355.2, 356, 72/377; 384/544
See application file for complete search history.

(56) References Cited

U.S. PATENT DOCUMENTS
2007/0065065 A1    3/2007   Ohtsuki et al.

FOREIGN PATENT DOCUMENTS
JP        11197780        7/1999
JP      2005-083513       3/2005
JP     20060-250317       9/2006

*Primary Examiner* — Alexander P Taousakis
(74) *Attorney, Agent, or Firm* — Hartman Global IP Law; Gary M. Hartman; Domenica N. S. Hartman

(57) ABSTRACT

The present invention provides a manufacturing method of a bearing ring member such as an outer ring comprising an installation portion on the outer peripheral surface and a double row of outer-ring raceways on the inner peripheral surface, in which a raw material is processed to obtain a final stage intermediate member through a first upsetting process, a forward-backward extrusion process, a second upsetting process, a burr removing process, and a punching process, wherein a movable die which leaves a stationary die in the final step is used in the second upsetting process, and the excess metal material is moved toward outside in the radial direction to a portion which become the installation section and a burr formation section, exposing a high pure metal material at least in a portion where the load of rolling bodies acts so as to ensure the rolling fatigue life of the both of outer-ring raceways.

8 Claims, 12 Drawing Sheets

(A)

(B)

METHOD FOR MANUFACTURING A BEARING RING MEMBER

FIELD OF THE INVENTION

The present invention relates to improvement of a method for manufacturing a bearing ring member of a rolling bearing unit for wheel support that is used for supporting wheels of an automobile or a rotating member for braking such as a brake disc with respect to a suspension apparatus. The bearing ring that is the object of the manufacturing method of the present invention comprises: a double row of back-to-back-arrangement outer-ring raceways at two locations in the axial direction around the inner peripheral surface thereof; and an outward facing flange around the outer peripheral surface thereof. This kind of bearing ring member corresponds to an outer ring that is connected and fastened to the suspension apparatus in the case when the aforementioned rolling bearing unit for wheel support is an inner-ring rotating type, and corresponds to a hub that supports and is fastened to a wheel and rotates with that wheel in the case when the above rolling bearing unit is an outer-ring rotating type.

When performing the manufacturing method of the present invention, the position in the axial direction of the outward facing flange does not particularly matter. However, regardless of whether the bearing ring member is an outer ring or hub, for the bearing ring member that is the object of the manufacturing method of the present invention, it is preferred that the location of the aforementioned outward facing flange in the axial direction of the bearing ring be such that at least part in the thickness direction of the outward facing flange be between the center positions of both outer-ring raceways. The center position of both these outer-ring raceways is the center position of contact surface between both outer-ring raceways and the rolling bodies (the contact ellipse in the case where the rolling bodies are balls). When the position of the outward facing flange is located at a position separated in the axial direction from between the center positions of both outer-ring raceways, the larger the amount of separation, the harder it is to obtain the effect of the present invention. However, even in this case, as long as it is not separated by a large amount, it is possible to improve durability when compared with prior manufacturing methods.

RELATED ART

Rolling bearing units for wheel support are widely used in order to support a disc or drum of a rotating braking member to the knuckle of a suspension apparatus such that it can rotate freely. Generally, an inner-ring rotating type as shown in FIG. 7 is used as this kind of rolling bearing unit for wheel support; however, in some cases an outer-ring rotating type such as shown in FIG. 8 is also used.

First, the inner-ring rotating type rolling bearing unit 1 for wheel support for an undriven wheel (front wheel of a FR type vehicle and MR type vehicle, and rear wheel of a FF type vehicle) shown in FIG. 7 supports a hub 3 on the inner-diameter side of the outer ring 2 via a plurality of rolling bodies 4 such that it rotates freely. When being used, the outer ring 2 is connected to and fixed to the knuckle, and the wheel and rotating brake member are supported to and fastened to the hub 3. In order for this, double-row outer-ring raceways 5 are formed at two locations on the inner peripheral surface of the outer ring 2, and an installation section 6, which is a outward facing flange, is formed around part of the outer peripheral surface of the outer ring 2 in the portion that is a little further inside in the axial direction than the center in the axial direction of the outer ring 2 (the inside in the axial direction is the side that will become the center side in the width direction of the vehicle during use, which is the top side in FIGS. 1 to 6 and 11, and the right side in FIGS. 7 to 9, and the outside in the axial direction is the side that will be the outside in the width direction of the vehicle during use, which is the bottom side in FIGS. 1 to 6 and 11, and the left side in FIGS. 7 to 9; this definition being the same throughout this specification). On the other hand, a support flange 7 for supporting and fastening a wheel and rotating brake member is formed on the outer peripheral surface of the hub in the portion near the outside end that protrudes outward in the axial direction further than the outer ring 2, and double-row inner-ring raceways 8 are formed in the middle section or near the inside end in the axial direction of the outer peripheral surface of the hub 3. A plurality of rolling bodies 4 are arranged in both rows between the inner-ring raceways 8 and outer-ring raceways 5 such that the hub 3 rotates freely in the inner-diameter side of the outer ring 2.

Moreover, the outer-ring rotating type of rolling bearing unit 1a for wheel support shown in FIG. 8 supports a hub 10 around a pair of inner rings 9, an inner-ring raceway 8 being formed around the outer peripheral surface of each, via a plurality of rolling bodies 4 such that the hub 10 rotates freely. When in use, both inner rings 9 are fastened around an axle that is located in a suspension apparatus, and the wheel and rotating braking member are supported and fastened to the hub 10. In order to accomplish this, double-row outer-ring raceways 5 are formed at two locations around the inner peripheral surface of this hub 10, and a support flange 7a, which is an outward facing flange, is formed around the portion that is further outside in the axial direction of the outer peripheral surface. A plurality of rolling bodies 4 are arranged in both rows between both inner-ring raceways 8 and both outer-ring raceways 5 such that the hub 10 rotates freely on the outer-diameter side of both inner rings 9. In the example shown in the figure, balls are used as the rolling bodies 4; however, in the case of a rolling bearing unit for wheel support of a heavy vehicle, conical rollers may be used as the rolling bodies.

A bearing ring member comprising double-row outer-ring raceways that are formed at two locations in the axial direction of the inner peripheral surface and an outward facing flange that is formed around the outer peripheral surface as in the outer ring 2 of the rolling bearing unit 1 for wheel support shown in FIG. 7 is made by combining a forging process, cutting process, and grinding process. For example, patent document 1 discloses a processing method for a hub body 11 of a hub 3a, which is a combination of an outer ring 2a and inner ring 9a of an inner-ring rotation type of rolling bearing unit 1b for wheel support of a drive wheel as shown in FIG. 9. That is, an intermediate member that has a shape close to that of the completed part is formed by performing forging of the material of the hub body 11 by a process as shown in (A) of FIG. 10, and forging of the material of the outer ring 2a by a process as shown in (B) of FIG. 10. The necessary cutting and grinding are performed on this intermediate member to obtain the outer ring 2a or hub body 11.

Incidentally, a circular column shaped material that is made by cutting a long material having a circular cross sectional shape and that was extruded by a steel manufacturer into a specified length can be used as the material for making the bearing ring for a rolling bearing unit for wheel support. The composition (purity) of the circular column shaped material that is obtained in this way is not uniform, that is, it is easy for non-metallic inclusions to exist in a range of 40% of the center section of the material (the circular column shaped section near the center up to 40% of the radius from the center), however, as disclosed in patent document 2, this is known. It is also known that there is low purity in the range of 20% near the outer diameter of the material (the cylindrical shaped section that exists on the outer peripheral surface side beyond 80% of the radius from the center) due to the fact that it is easy for oxides or non-metallic inclusions to exist. Moreover, when metal material having low purity that exists near the center or outer peripheral surface is exposed in the portion of the raceway surface provided on the surface of the bearing ring member, it becomes difficult to maintain the rolling fatigue life of that portion.

When these problems are taken into consideration, as well as when variation of the distribution of oxides and non-metal material in the material and various variations (such as in pressure) that occur during manufacturing are taken into consideration, it is preferred that the metal material that exists in a range of 50% of the center portion of the material, and in the range of 30% of the outer diameter of the material is not exposed in at least the portion of the raceway surface where there is rolling contact with the rolling surface. In other words, it is preferred that metal material that exists in the middle cylindrical shaped portion, which is the portion in the range of 50 to 70% of the radius from center is exposed in at least the portion of the raceway surface where there is rolling contact with the rolling surface.

In the case of making a bearing ring member such as that of the object of the manufacturing method of the present invention that comprises a double-row of back-to-back arrangement outer-ring raceways at two locations in the axial direction around the inner peripheral surface of the outer ring, and with the position in the axial direction of the outward facing flange that is provided on the outer peripheral surface of the outer ring located such that at least a part in the thickness direction of this outward facing flange is between the center positions of both outer-ring raceways, it is difficult for the middle cylindrical section described above to become exposed in the surfaces of both raceways. For example, in the method disclosed in the aforementioned patent document 1 and shown in (B) of FIG. 10 described above, when making the outer ring 2 for the rolling bearing unit 1 for wheel support shown in FIG. 7, the metal material of each of the parts being formed, or in other words, the metal material 12 of the circular column shaped portion near the center up to 50% of the radius from the center, the metal material 13 that exists in the middle cylindrical shaped portion in the range from 50 to 70% of the radius from the center, and the metal material 14 that exists in the cylindrical shaped portion near the outer diameter in the range near 30% of the outer diameter is distributed in the outer ring 2 as shown in FIG. 11. After the intermediate member 15 is formed by forging as indicated by the solid line in FIG. 11, this outer ring 2 is completed by performing cutting and grinding processes to cut the intermediate member 15 until it is in the state shown by the dashed line in FIG. 11.

By exposing the metal material 13 that exists in the middle cylindrical portion indicated by the diagonal lattice in FIG. 11 that shows the intermediate member 15 and the outer ring 2 to the pair of outer-ring raceways 5, the rolling fatigue life of both of these outer-ring raceways is maintained, and it becomes easier to maintain the durability of the rolling bearing unit 1 for wheel support, including the outer ring 2. However, as can be clearly seen from FIG. 11, when making the outer ring 2 using a prior manufacturing method, the metal material 12 of the circular column shaped portion near the center is exposed in the surface of part of the outer ring raceways 5 on the inside in the axial direction of both outer-ring raceways 5 (particularly, the portion located on the inner diameter side of the installation section 6, which is the outward facing flange). Therefore, in the prior known manufacturing method for a bearing ring member, the freedom of design for maintaining the durability of the rolling bearing unit 1 for wheel support is limited.

Patent document 2 discloses a manufacturing method for a bearing ring member in which, by improving the extrusion method when performing forward and backward extrusion of the circular column shaped material, the metal material 12 of the circular column shaped portion near the center does not exist in the portion of the intermediate member that will become the outer-ring raceways (portion indicated by the diagonal lattice in (B) and (C) of FIG. 12 to be described later). In the case of this prior manufacturing method, the center portions on both end surfaces in the axial direction of the circular column shaped material 16 as shown in (A) of FIG. 12 are compressed in the direction toward each other to form an intermediate member 20 that comprises first and second circular concave sections 17, 18 that open into both end surfaces in the axial direction, and a partitioning section 19 that is located between the bottom surfaces of both of these circular concave sections 17, 18. Furthermore, specified cutting and grinding processes are performed on this intermediate member 20 to obtain an outer ring 2b having a cross-sectional shape as shown by the dashed line in (B) and (C) of FIG. 12.

When the location where the partitioning unit 19 is formed is not improved, metal material 12 of the circular column shaped portion near the center exists in the portion that will become the outer-ring raceways 5. In this case, by placing the formation location of the partitioning section 19 between the portions that will become the outer-ring raceways, the metal material 12 of the circular column shaped portion near the center will no longer exist in the portion that will become the outer-ring raceways 5. However, as shown in (C) of FIG. 12, it is not possible to achieve both a higher degree of reduction in manufacturing cost and improvement of durability by just improving the formation location of the partitioning section 19.

In other words, the partitioning section 19 is later punched out and removed, then disposed of as scrap and recycled. Therefore, from the aspect of easily performing this punch out and removal work, as well as from the aspect of improving yield rate of material, the smaller the dimension in the axial direction (thickness) the partitioning section 19 is, the better. However, from the state shown in (C) of FIG. 12, by further compressing the partitioning section 19, the metal material 12 of the circular column shaped portion near the center moves to the portion that will become the both of the outer-ring raceways 5, and it becomes difficult to maintain the rolling fatigue life of both of these outer-ring raceways 5. In other words, in the manufacturing method shown in (A) to (C) of FIG. 12, it becomes necessary to substantially increase the dimensions in the axial direction of the partitioning section 19, which from the aspect of keeping down manufacturing cost is not preferred for a manufactured product.

Patent document 1: Japanese Patent Application Publication No. 2005-83513

Patent document 2: Japanese Patent Application Publication No. 2006-250317

SUMMARY OF THE INVENTION

[Problems to be Solved by the Invention]

Taking the problems described above into consideration, it is the object of the present invention to provide a manufacturing method for a bearing ring member in which, when making a bearing ring member comprising double-row outer-ring raceways at two locations in the axial direction around the inner peripheral surface and an outward facing flange around the outer peripheral surface by plastically deforming a circular column shaped material, metal material of a middle cylindrical shaped portion of the material having high purity is exposed in at least the portion of both outer-ring raceways where the load of the rolling bodies act, and done so at low cost.

It is preferred that the manufacturing method of the present invention, be performed for a bearing ring member of which at least part in the thickness direction of the outward facing flange section exists between the center positions of both outer-ring raceways (between dotted lines α and β in FIG. 3 described later) as the object. When the position in the axial direction of the outward facing flange does not satisfy this condition, it becomes easy for metal material other than the metal material of the highly pure middle cylindrical portion to become exposed in the surface portion of both outer-ring raceways. Therefore, when the outward facing flange is located in a portion that is greatly separated from the aforementioned portion between raceways, for example, then it is preferred that a manufacturing method other than that of the present invention, for example a method such as disclosed in Japanese Patent Application No. 2006-309916, be used.

[Means for Solving the Problems]

The manufacturing method for a bearing ring member of the present invention forms a bearing ring member having a double-row of back-to-back arrangement outer-ring raceways at two locations in the axial direction around the inner peripheral surface of a cylindrical member and an outward facing flange around the outer peripheral surface.

In for that, first, an upsetting process is performed to compress a circular column shaped metal raw material in the axial direction to obtain a preliminary stage intermediate member, the outer diameter of the middle section in the axial direction thereof being greater than the outer diameter of both end sections in the axial direction.

After that, with this preliminary stage intermediate member surrounded by dies having a flange formation space for forming an outward facing flange, this preliminary stage intermediate member is pressed from both ends in the axial direction by a pair of punches to plastically deform this preliminary stage intermediate member. Moreover, both ends in the axial direction are formed into cylindrical sections having an inner peripheral surface shape that fits the outer peripheral surface shape of these punches, and forms an outward facing flange around the outer peripheral surface having a shape that fits the flange formation space to obtain a later stage intermediate member.

Particularly, in the manufacturing method for a bearing ring member of the present invention, a material having a volume that is larger than that necessary for forming this later stage intermediate member is used as the raw material. Also, dies comprising a stationary die, which is fixed around one of the two punches, and a movable die, which is located around the other of the two punches such that it applies an elastic force in the direction toward the stationary die, are used as the dies.

Moreover, with the tip end surface of the movable die and the tip end surface of the stationary die facing each other, the punches compress the preliminary stage intermediate member from both ends in the axial direction causing the metal material of the preliminary stage intermediate member to fill into a cavity that is surrounded by both of the dies and both of the punches. After that, this metal material presses the movable die causing the movable die to move back from the stationary die against the elastic force such that the extra metal material moves into a space that occurs between the tip end surfaces of the dies, forming burrs in that section. The burrs are removed later by punching or cutting.

More specifically, when performing the manufacturing method for a bearing ring member of the present invention as described above, a forward-backward extrusion process is performed that compresses the preliminary stage intermediate member in a direction such that the center portions of both end surfaces in the axial direction thereof are moved toward each other. In doing so, a second preliminary stage intermediate member is obtained that comprises: a first circular concave section that opens into the surface on one end in the axial direction; a second circular concave section that opens into the surface on the other end in the axial direction; and a partitioning section that is located between the bottom surfaces of both of the circular concave sections.

After the forward-backward extrusion process, with this second preliminary stage intermediate member set on the inner diameter side of both the stationary and movable dies, this second preliminary stage intermediate member is pressed between the tip end surfaces of the pair of punches. The partitioning section is compressed without changing the depth or inner surface shape of the first circular concave section, causing the metal material to move outward in the radial direction forming an outward facing flange around the outer peripheral surface (by way of a post-preliminary stage intermediate member having burrs) to obtain a later stage intermediate member.

Alternatively, with the preliminary stage intermediate member set on the inner diameter side of both the stationary and movable dies, this preliminary stage intermediate member is pressed between the tip end surfaces of a pair of punches. The above forward-backward extrusion process is omitted. Doing so compresses the center portion in the radial direction of this preliminary stage intermediate member and moves the metal material outward in the radial direction, as well as forms a first circular concave section that opens into the surface of one end in the axial direction, a second circular concave section that opens into the surface of the other end in the axial direction, a partitioning section that is located between the bottom surfaces of both of these circular concave sections, and an outward facing flange (by way of a post-preliminary stage intermediate member having burrs) to obtain a later stage intermediate member.

When performing the manufacturing method for a bearing ring member of the present invention as described above, it is preferred that the inner peripheral surface of the first circular concave section be a stepped cylindrical shape where the rear half having a small inner diameter is continuous at the step section with the half on the opening side having a large inner diameter.

More specifically, when performing the manufacturing method for a bearing ring member of the present invention, after a post-preliminary stage intermediate member is formed by plastically deforming the preliminary stage intermediate member between the stationary and movable dies and the pair of punches, burrs that are formed on the outer peripheral surface of the outward facing flange, which correspond to the space between the tip end surfaces of the dies and that protrude outward in the radial direction from the outer peripheral surface, are punched and removed to obtain a later stage intermediate member.

Furthermore, after the later stage intermediate member is formed by plastically deforming the preliminary stage intermediate member between the stationary and movable dies and the pair of punches, the partitioning section is punched out and removed.

ADVANTAGES OF THE INVENTION

With the manufacturing method for a bearing ring member of the present invention as described above, the metal material of the highly pure middle cylindrical portion of the raw material is exposed in at least the portion of the outer-ring races ways, which are located at two locations around the inner peripheral surface of the ring member and separated in the axial direction, where the load of the rolling bodies that acts. Therefore, it is possible to improve the freedom of design for maintaining the rolling fatigue life of the outer-ring raceways, and for maintaining the durability of a rolling bearing unit for wheel support that includes the bearing ring member that comprises these outer-ring raceways. In addition, the highly pure metal material is exposed in the portion of the outer-ring raceways where the load of the rolling bodies acts even when the dimension in the axial direction (thickness) of the partitioning section is made small, so by simplifying the work of removing the partitioning section and by improving the yield rate of the material, it is possible to keep the manufacturing cost from rising.

Also, by applying suitable construction from among the forms described above as needed, it is possible to effectively expose the metal material of the middle cylindrical portion to the surface portion of each of the outer-ring raceways in accordance to the position in the axial direction of the outward facing flange and the position of each of the outer-ring raceways.

Moreover, by punching out and removing the burrs that are formed in the space between the tip end surfaces of the stationary and movable dies, it is possible make the dimensions and shapes of each of the parts, including the outward facing flange, as desired with good precision, while keeping down processing costs.

Furthermore, by punching out and removing the partitioning section after the later stage intermediate member has been made, it is possible to remove excess metal material and to obtain a lightweight rolling bearing unit for wheel support. Instead of making the thickness of other parts, such as the cylindrical portion where the outer-ring raceways are formed thin, it is possible to apply construction that makes it possible to maintain strength by the partitioning section; where in this case, the process for removing the partitioning section is not necessary.

DESCRIPTION OF THE PREFERRED EMBODIMENTS

[First Embodiment]

Figure 1:
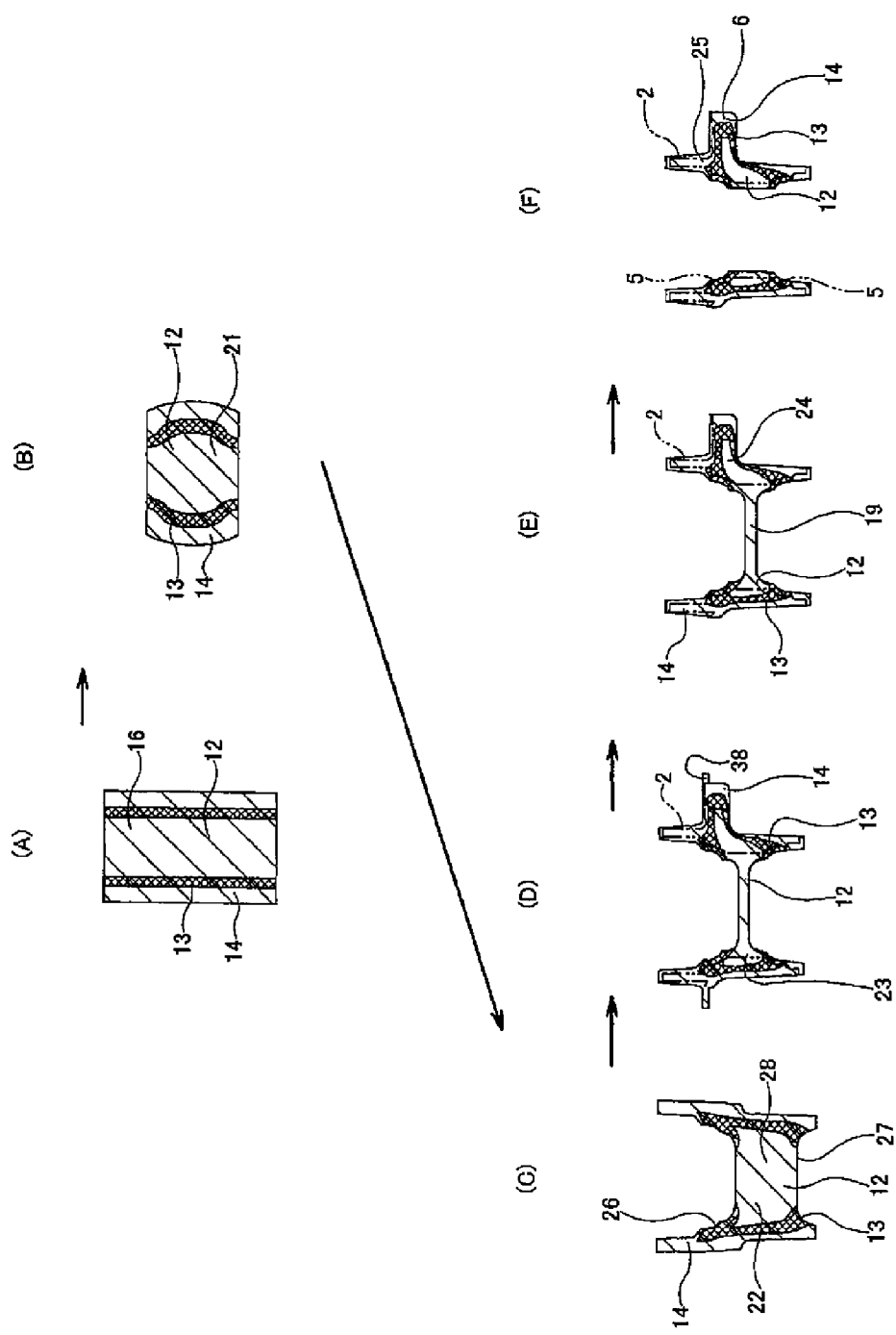
FIG. 1 shows the processing steps of a first embodiment of the manufacturing method for a bearing ring member of the present invention, and are cross-sectional drawings from the raw material to the final stage intermediate member.

FIGS. 1 to 4 shows a first embodiment of the present invention. The manufacturing method of this first embodiment sequentially performs plastic working or punching on a metal circular column shaped raw material 16 such as a steel alloy like medium carbon steel, bearing steel or carburized steel that can be quench hardened after plastic working as shown in (A) of FIG. 1. Also, going through a preliminary stage intermediate member 21 shown in (B), and second preliminary stage intermediate member 22 shown in (C), a post-preliminary stage intermediate member 23 shown in (D), and a later stage intermediate member 24 shown in (E), obtains the final stage intermediate member 25 shown in (F). Furthermore, the manufacturing method performs the necessary cutting and grinding on this final stage intermediate member 25 to obtain an outer ring 2 of an inner-ring rotating type rolling bearing unit 1 for wheel support as shown in FIG.

7 and described above. The volume of the raw material 16 is greater than the volume of the later stage intermediate member 24 (by just the amount of burrs 38 as will be explained later). The steps of processing the raw material 16 into the final stage intermediate member 25 will be explained in order below. The processing described below is basically all performed hot or warm; however, when forming a small hub or the like, processing can be performed cold when possible.

First, as shown in (A) to (B) of FIG. 1, in a first upsetting process, the raw material 16 is compressed in the axial direction to expand the outer diameter, and this raw material 16, whose middle is expanded in the radial direction into a beer barrel shape, is taken to be the preliminary stage intermediate member 21.

Next, as shown in (B) to (C) of FIG. 1, in a forward-backward extrusion process, plastic working is performed on the preliminary stage intermediate member 21 to form the second preliminary stage intermediate member 22. In this kind of forward-backward extrusion process, a method that is widely known in the field of forging is used to compress the portion of the preliminary stage intermediate member 21 that is near the center in the radial direction in the axial direction, and this metal material of the portion near the center in the radial direction is moved outward in the radial direction while also moving toward both sides in the axial direction (forward and backward direction).

In the next process of compressing the portion near the center in the radial direction of the preliminary stage intermediate member 21 in the axial direction, the preliminary stage intermediate member 21 is set in a die that corresponds to the outer shape of the second preliminary stage intermediate member 22 (unevenness is opposite), and in that state, the center of the surfaces of both ends in the axial direction of the preliminary stage intermediate member 21 are pressed by a concentric pressing punch and counter punch. Generally, with the counter punch fixed as shown at the bottom in FIG. 1, the pressing punch located at the top of FIG. 1 is pressed toward the counter punch. Also, the metal material of the preliminary stage intermediate member 21 is moved and filled into the cavity that is formed by the inner peripheral surface of the die and the outer peripheral surfaces of the pressing punch and counter punch (outer peripheral surface and end surfaces) to obtain the second preliminary stage intermediate member 22.

This second preliminary stage intermediate member 22 comprises: a first circular concave section 26 that is open into one end surface in the axial direction (the top end surface in FIGS. 1 to 4) and a second circular concave section 27 that is open into the other end surface (bottom end surface in FIGS. 1 to 4), and a partitioning section 28 that is located between the bottom surfaces of both these circular concave sections 26, 27. In this embodiment, the first circular concave section 26 has a stepped shape, where the rear half has a small inner diameter, and the half toward the opening has a large inner diameter, with these sections being continuous at the step section. In order for this, a stepped pressure punch is used whose tip end has a small diameter and the base end has a large diameter. In this kind of forward-backward extrusion process, as plastic working is performed on the preliminary state intermediate member 21 to obtain the second preliminary stage intermediate member 22, the distribution of the metal material 12 of the circular column shaped portion near the center, the metal material 13 of the middle cylindrical portion and the metal material 14 of the cylindrical portion near the outer diameter changes as shown in (B) to (C) of FIG. 1.

Figure 2:
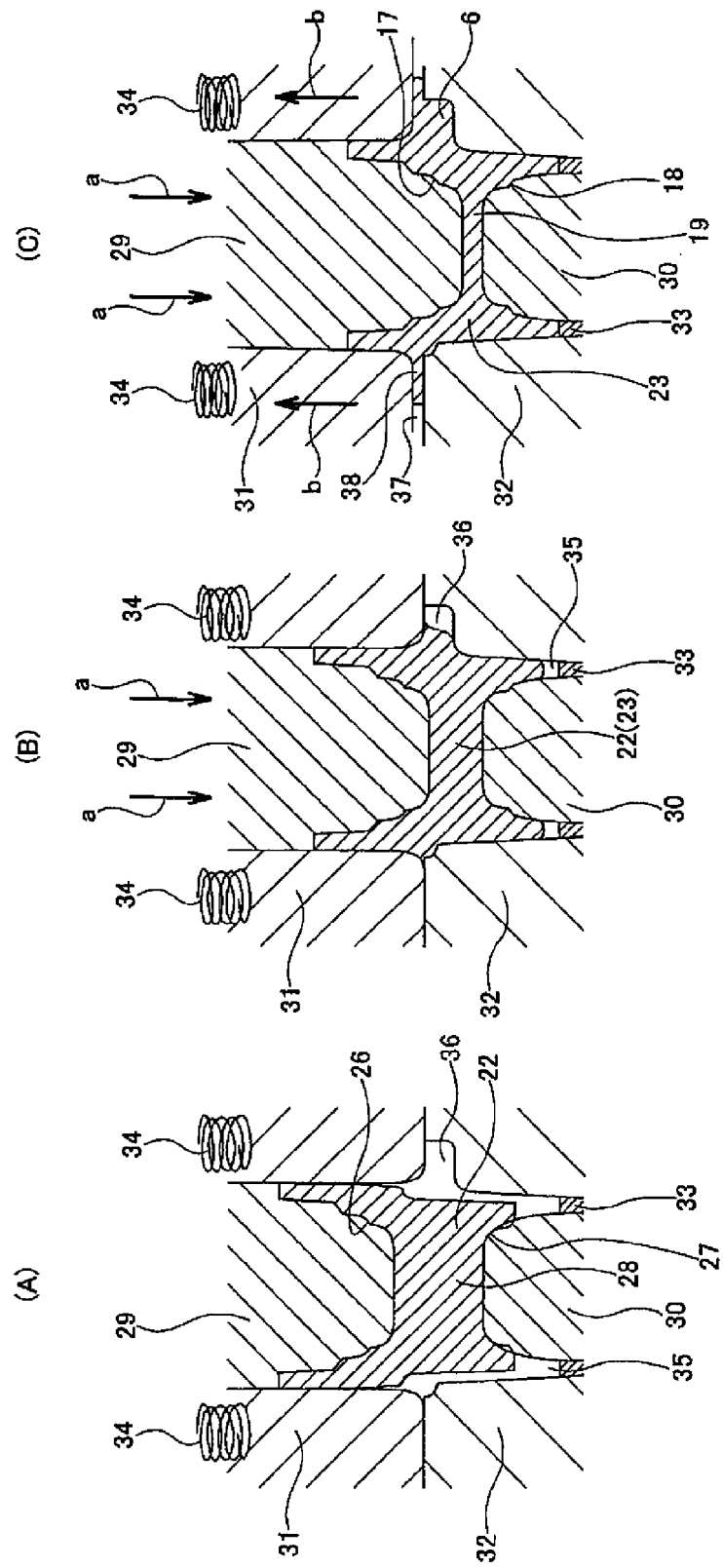
FIG. 2 shows cross-sectional drawings of the condition of the processing steps of a second upsetting process for forming first and second circular concave sections on both ends in the axial direction of the second preliminary stage intermediate member, and for forming an outward facing flange on the outer peripheral surface.

Next, a second upsetting process is performed on the second preliminary stage intermediate member 22 that is made as described above, to obtain the post-preliminary intermediate member 23. This second upsetting process is performed using the upsetting apparatus that is shown in FIG. 2. This upsetting apparatus comprises: a pressing punch 29 that corresponds to one punch; a counter punch 30 that similarly corresponds to another punch; an upper die 31 that similarly corresponds to a movable die; a lower die 32 that similarly corresponds to a stationary die; and an extrusion punch 33.

Of these components 29 to 33, the upper die 31 is supported by the bottom surface of the press ram such that it can move up or down with respect to the ram, and it is pressed downward by a large elastic force from springs 34 having a large elastic force. The amount that the upper die 31 moves downward with respect to the ram is regulated by a stopper mechanism that is provided between the ram and the upper die 31. Also, the amount that the upper die 31 moves upward is limited, for example, by the top surface of the upper die 31 coming in contact with the bottom surface of the ram. Therefore, the upper die 31 normally moves downward together with the ram, however, when a large upward force is applied, the upper die 31 is moved upward with respect to the ram against the elastic force of the springs 34. Moreover, the pressing punch 29 is located on the inner diameter side of the upper die 31 and fastened to the ram. Therefore, the upper die 31 is supported around the pressing punch 29 such that it can move a specified amount in the axial direction (up or down) with respect to the pressing punch 29. Also, when the ram is lowered, the surface on the bottom end of the upper die 31 comes in contact with the surface on the top end of the lower die 32 before the partitioning section 28 of the second preliminary stage intermediate member 22 is firmly held between the bottom end surface of the pressing punch 29 and the top end surface of the counter punch 30. When the ram is further lowered from this state, the upper die 31 stops as is at that position, and only the pressing punch 29 moves downward with the ram. When this happens, the springs 34 elastically deform.

On the other hand, the counter punch 30 and lower die 32 are concentrically fixed to the top surface of the support bed of the press, and between both a bottom cavity 35 is provided that has an inner peripheral surface shape that fits with the outer peripheral surface shape (the unevenness is opposite) of the outer half in the axial direction of the post-preliminary stage intermediate member 23. The counter punch 30 and lower die 32 are not moved as the second upsetting process proceeds. Furthermore, the extrusion punch 33 has a cylindrical shape, and the top end surface thereof partitions off the bottom end section of the bottom cavity 35. This kind of extrusion punch 33 is supported such that it can move up or down with respect to the support bed of the press. When this extrusion punch 33 is completely lowered, the inner peripheral surface shape of the bottom cavity 35 fits with the outer peripheral surface shape of the outer half section in the axial direction of the post-preliminary stage intermediate member 23 (later stage intermediate member 24). In this embodiment of the invention, both the tip end section of the pressing punch 29 and the tip end section of the counter punch 30 are step shaped, with the small-diameter section near the tip end and the large-diameter section near the base end being continuous at the step section.

When an upsetting apparatus having the construction described above is used to perform the second upsetting process on the second preliminary stage intermediate member 22 to obtain the post preliminary stage intermediate member 23, first, the portion near the outer end in the axial direction of the second preliminary stage intermediate member 22 is inserted into the lower die 32. Also, the top end section of the counter punch 30 fits inside the second circular concave section 27 that is formed in the outside end surface in the axial direction of the second preliminary stage intermediate member 22. After that, the ram is lowered, and as shown in (A) of FIG. 2, causes the pressing punch 29 to fit inside the first circular concave section 26 that is formed in the inside end surface in the axial direction of the second preliminary stage intermediate member 22, and causes the top end surface of the lower die 32 and one surface of the upper die 31 to come together. In this state, a flange formation space 36 is formed between the surfaces of these dies 32, 31 that have come together.

As shown by the arrow 'a' in (B) and (C) of FIG. 2, when the ram is lowered further from this state, the upper die 31 stops as is at that position as shown in (A) to (B) of FIG. 2 and only the pressing punch 29 moves downward. As the pressing punch 29 moves, the pressing punch 29 presses the center portion in the radial direction of the second preliminary stage intermediate member 22 in the axial direction, and compresses this portion to make the partitioning section 28 a partitioning section 19 having a small thickness dimension. By compressing the center portion in the radial direction in this way, the extruded metal material moves into the bottom cavity 35 and forms that portion into a cylindrical shape, while part of that extruded metal material moves outward in the radial direction toward the flange-formation space 36, and inside this flange-formation space 36, the protruding portion of an outward facing flange, which will function as the installation section 6, is formed.

As shown in (C) of FIG. 2, when the pressing punch 29 has been sufficiently lowered and a sufficient amount of metal material has been pressed into the flange-formation space 36, the increase in pressure in this flange-formation space 36 causes the force pressing upward on the upper die 31 to increase. When this force becomes greater than the elastic force of the springs 34, the force moves the upper die 31 upward against the elastic force of the springs 34 as shown by arrow 'b' in (C) of FIG. 2, and as the top end surface of this upper die 31 separates from the lower die 32, a space 37 occurs between both of these end surfaces. When this happens, part of the metal material that moved inside the flange-formation space 36 moves into this space 37 and forms burrs 38 around the outer edge of the protruding that will function as the installation section 6. As a result, the post-preliminary stage intermediate member 23 as shown in (D) of FIG. 1 is obtained. The inner peripheral surfaces of the first and second circular concave sections 17, 18 that are formed in this post-preliminary stage intermediate member 23 have a stepped cylindrical shape where the rear half section having a small diameter is continuous with the half near the opening having a large diameter at the step section.

With this second upsetting process that is performed as shown in (C) to (D) of FIG. 1, the distribution of the metal material 12 of the circular column shaped portion near the center, the metal material 13 of the middle cylindrical portion and the metal material 14 of the cylindrical portion near the outer diameter changes as shown in (C) to (D) of FIG. 1. In this second upsetting process, the inner peripheral surface shape of the first circular concave section 26 that is adjacent to the portion where the inside outer-ring raceway 5 in the axial direction of both outer-ring raceways 5 is not allowed to change. The depth of the second circular concave section 27 is increased. Moreover, as a result of this second upsetting process, a large amount of the metal material that is extruded from the partitioning section 28 that is located between both circular concave sections 26, 27 becomes the protruding section, which will become the installation section 6, and the burrs 38. The protruding section and burrs 38 are located in the outer portion in the radial direction between the center positions of the pair of outer-ring raceways 5, so a large amount of the metal material that is extruded from the partitioning section 28 (particularly, the metal material 12 of the circular column shaped portion near the center) is not moved to the portion that will become the outer-ring raceways 5, but rather is moved outward in the radial direction passing by the portion where these outer-ring raceways 5 will be formed. Therefore, as can be clearly seen from (D) of FIG. 1 and (A) of FIG. 4, in the post-preliminary stage intermediate member 23 (later stage intermediate member 24), highly pure metal material 13 of the middle cylindrical portion is located in the portion where the outer-ring raceways 5 will be formed later.

In the case of this embodiment described above, in the state after the processing of the post-preliminary stage intermediate member 23 is completed, the tip end surfaces of the both dies 31, 32 are not in contact with each other, and there is a space 37 between these tip end surfaces. Extra metal material fills into this space 37 and forms burrs 38. The post-preliminary stage intermediate member 23 that was formed in this way with burrs 38 protruding from the outer peripheral surface of the installation section 6 is removed from the upsetting apparatus by raising the pressing punch 29 and the upper die 31, and then raising the extrusion punch 33. As shown in (D) to (E) of FIG. 1, the burrs 38 are punched out and removed to obtain the later stage intermediate member 24.

Figure 3:
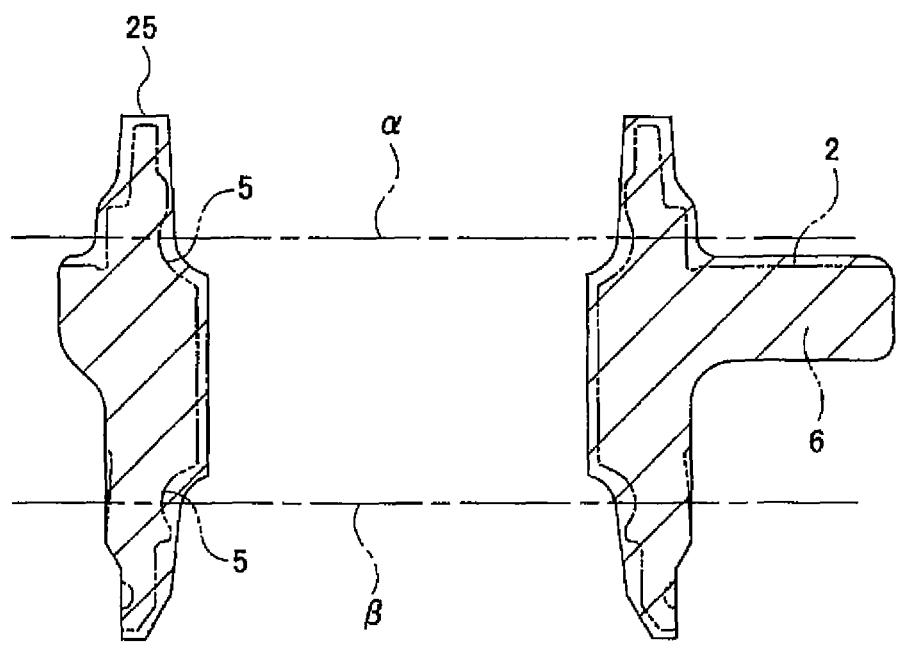
FIG. 3 shows cross-sectional drawings of the range of the position in the axial direction of the installation section on an outer ring for which it is preferable that the manufacturing method of the present invention be applied.
Figure 4:
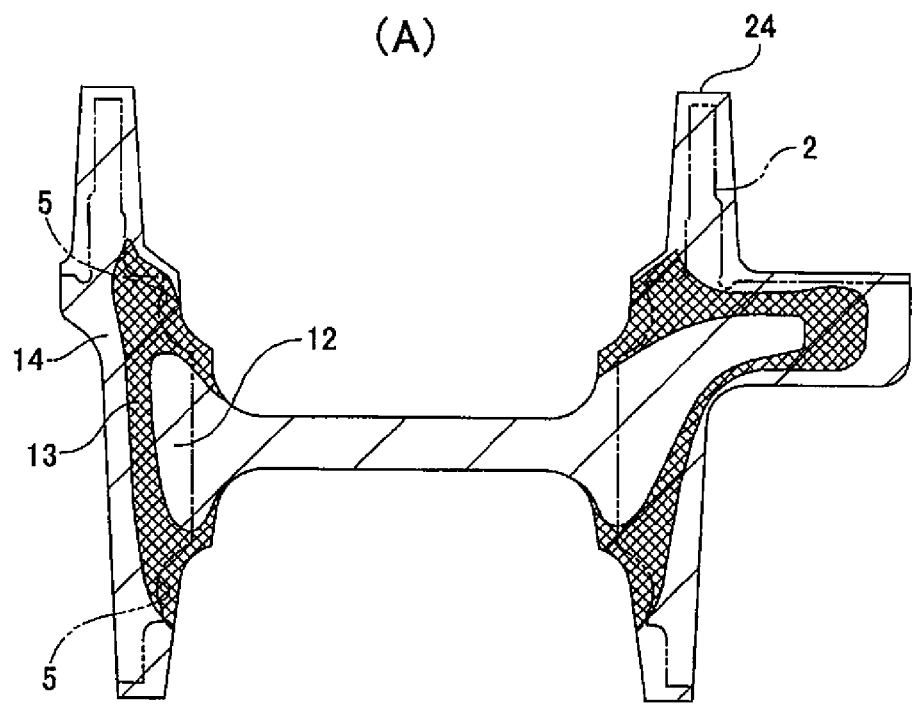
FIG. 4 shows cross-sectional drawings of the distribution of the metal material of the circular column shaped portion near the center, the metal material of the middle cylindrical portion and the metal material of the cylindrical portion near the outer diameter of the later stage intermediate member; where (A) shows the case when made according the manufacturing method of the first embodiment, and (B) shows the case when movable dies are not used.
Figure 4:
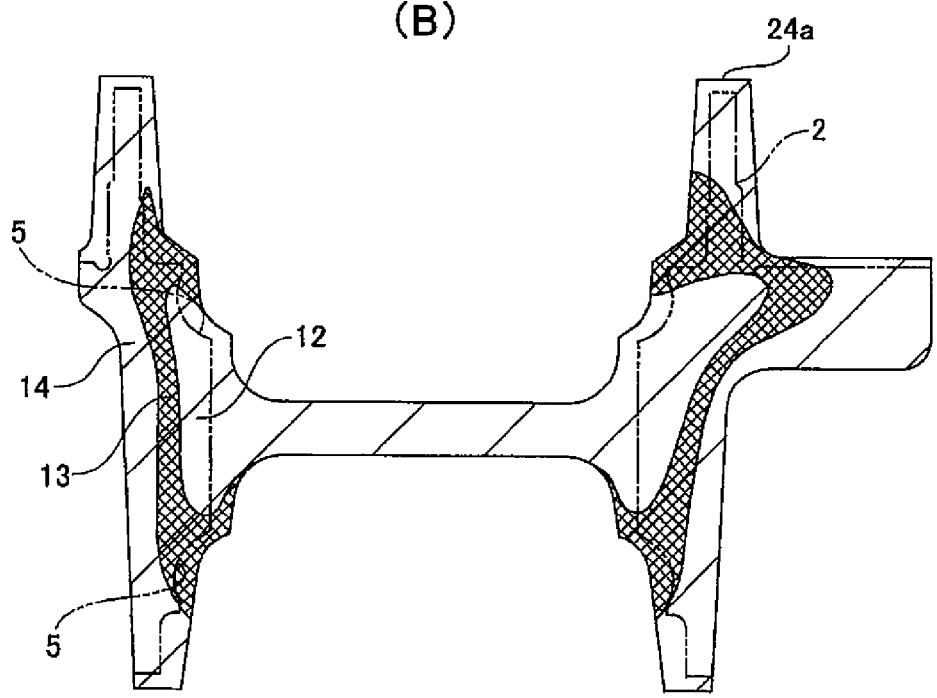

Also, as shown in (E) to (E) of FIG. 1, the partitioning section 19 that is located between both circular concave sections 17, 18 is punched out and removed by a press process or the like to obtain the final stage intermediate member 25. This final stage intermediate member 25 is thicker than the complete outer ring (see the dashed line in (A) of FIG. 4). In order for this, specified cutting (turning) and grinding processes are performed on this final stage intermediate member 25 to obtain the completed outer ring 2. As shown in FIG. 3, in this completed state, the installation section 6 is located between virtual planes a and 13 that are orthogonal to the center axis of the outer ring 2. (A) of FIG. 4 shows the distribution of the metal material 12 to 14 in the stage of the later stage intermediate member 24, and shows the completed outer ring 2 (see the dashed line in (A) of FIG. 4). As can be clearly seen from (A) of FIG. 4, with the manufacturing method for the outer ring 2 of this embodiment, of the outer-ring raceways 5 that are formed around the inner peripheral surface of the outer ring 2 at two locations that are separated in the axial direction, the highly pure metal material 13 of the middle cylindrical portion can be exposed in at least the portion where the load of the rolling bodies acts. Therefore, it is possible to improve freedom of design for maintaining the rolling fatigue life of both outer-ring raceways 5 and maintaining the durability of a rolling bearing unit for wheel support that includes an outer ring 2 comprising these outer-ring raceways 5.

On the other hand, (B) of FIG. 4 shows the distribution of the metal material 12 to 14 for the case in which the dies are kept together (the movable die is not used) and plastic working is performed on the later stage intermediate member 24a that has the same shape as that shown in (A) of FIG. 4. In this case, the metal material that moved into the flange formation space 36 does not greatly move outward in the radial direction toward the space 37 (see FIG. 2), so it is easy for the metal material 12 of the circular column shaped portion near the center to spread in the axial direction, and this impure metal material 12 is exposed in part of the outer-ring raceway 5 that is on the inside in the axial direction (portion around which the installation section 6 is not located). Therefore, it is difficult to obtain an outer ring 2 having sufficient durability.

[Second Embodiment]

Figure 5:
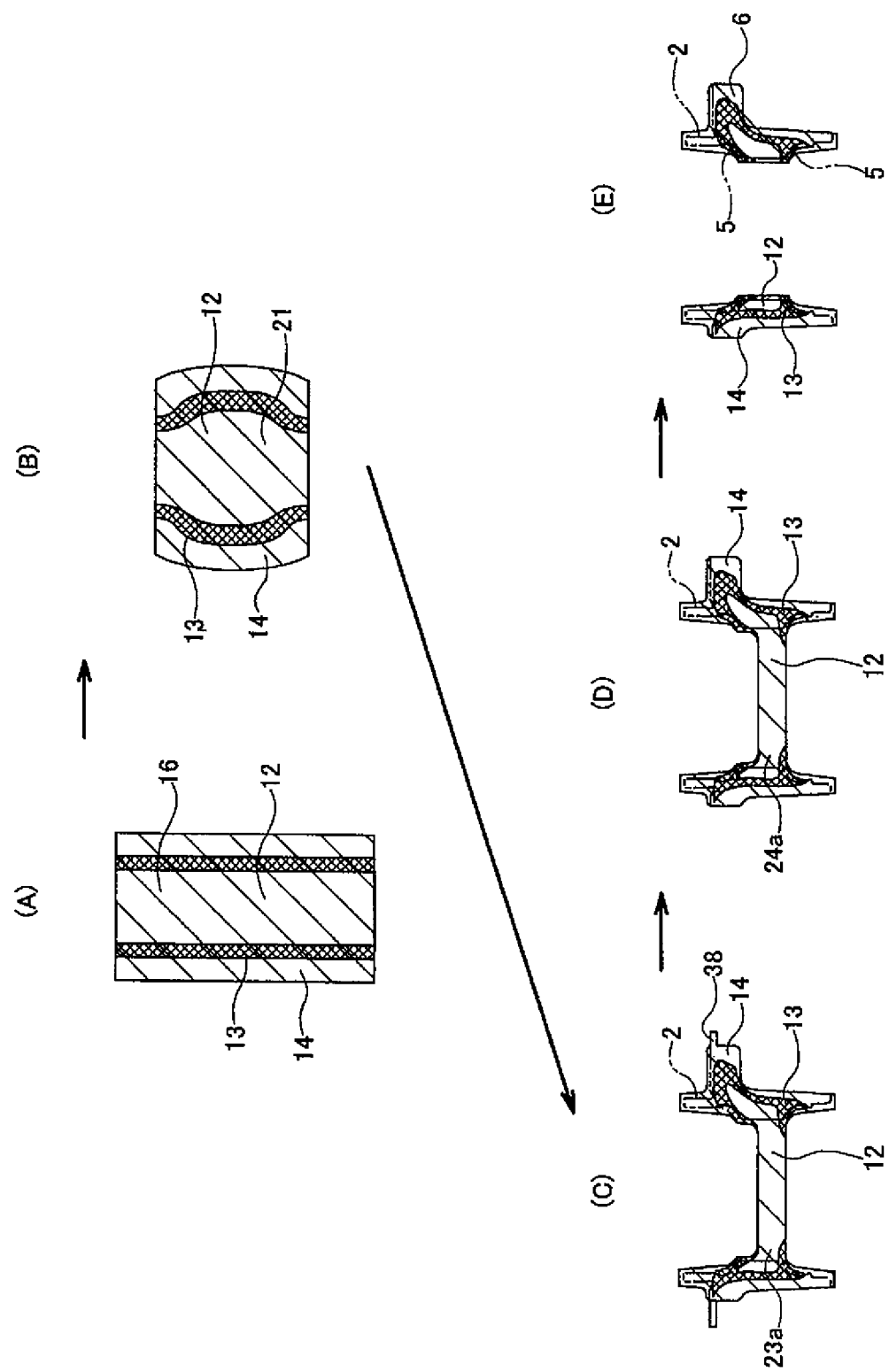
FIG. 5 is a drawing similar to FIG. 1 and shows a second embodiment of the manufacturing method for a bearing ring member of the present invention.
Figure 6:
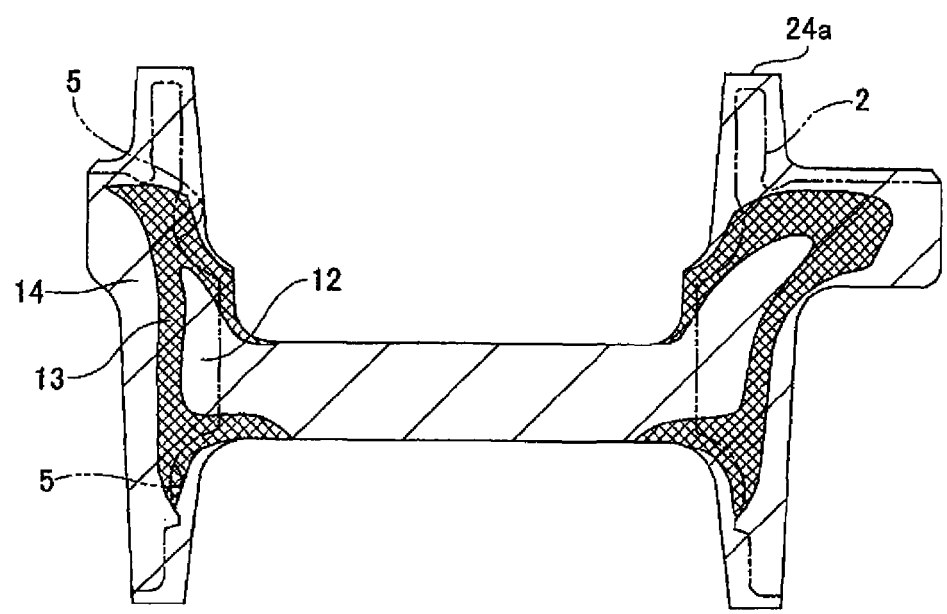
FIG. 6 is a cross-sectional drawing showing the distribution of the metal material of the circular column shaped portion near the center, the metal material of the middle cylindrical portion and the metal material of the cylindrical portion near the outer diameter of later stage intermediate member in a second embodiment of the invention.

FIG. 5 shows a second embodiment of the present invention. In this embodiment, the forward-backward extrusion process that was performed in the first embodiment described above is omitted. In other words, the second upsetting process shown in FIG. 2 and described above is performed directly on the preliminary stage intermediate member 21 that is shown in (B) of FIG. 5 to obtain the post-preliminary stage intermediate member 23a shown in (C) of FIG. 5, and then the burrs 38 are removed to obtain the later stage intermediate member 24a shown in (D) of FIG. 5 and in FIG. 6. This kind of embodiment can be applied for a case in which plastic working is performed all at once such as when the outer ring to be manufactured is small, or when the size of the press apparatus for performing the press processing is large. In this embodiment, the distribution of metal material 12 of the circular column shaped portion near the center, the metal material 13 of the middle cylindrical portion and the metal material 14 of the cylindrical portion near the outer diameter in the later stage intermediate member 24a is as shown in FIG. 6. As is clear from FIG. 6, in the case of this embodiment as well, of the outer-ring raceways 5 that are formed around the inner peripheral surface of the outer ring 2 at two locations that are separated in the axial direction, the highly pure metal material 13 of the middle cylindrical portion can be exposed in at least the portion where the load of the rolling bodies acts. Therefore, it is possible to improve freedom of design for maintaining the rolling fatigue life of both outer-ring raceways 5 and maintaining the durability of a rolling bearing unit for wheel support that included an outer ring 2 comprising these outer-ring raceways 5.

[Industrial Applicability]

Figure 7:
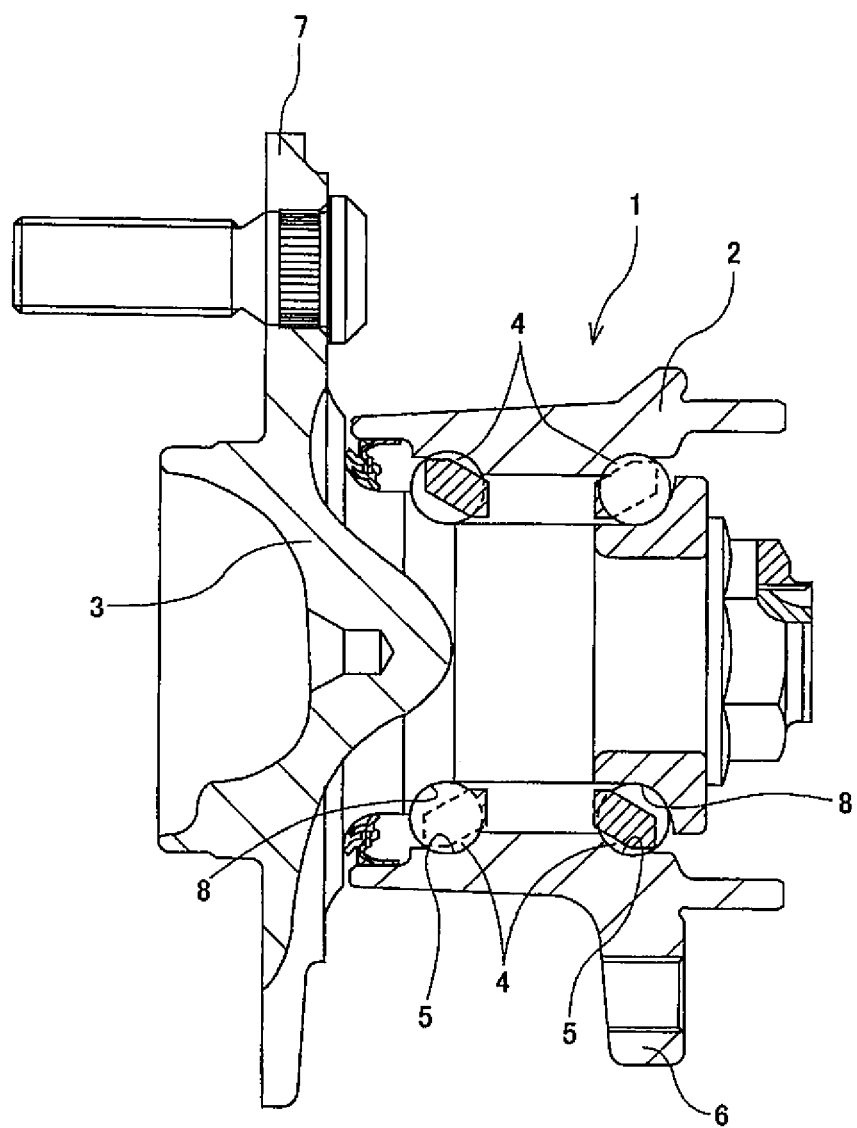
FIG. 7 is a cross-sectional drawing showing an example of an inner-ring rotating type rolling bearing unit for wheel support for an undriven wheel that comprises an outer ring, which is the bearing ring member that is the object of the manufacturing method of the present invention.
Figure 8:
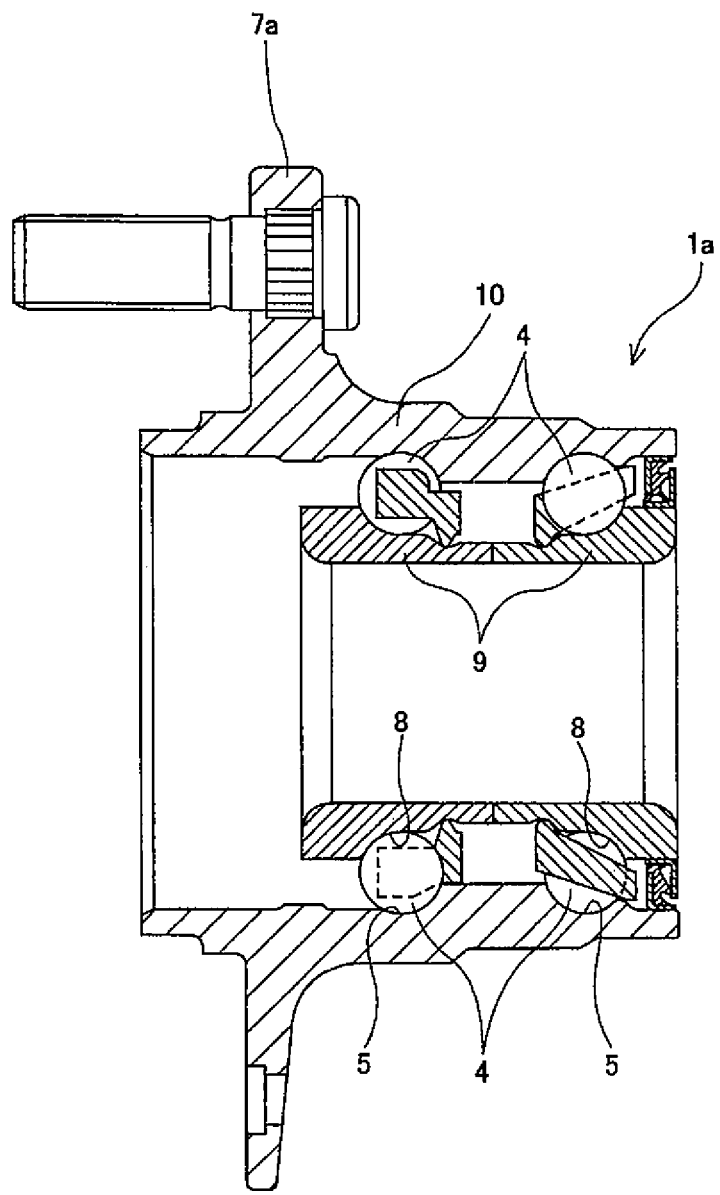
FIG. 8 is a cross-sectional drawing showing an example of an outer-ring rotating type rolling bearing unit for wheel support that comprises a hub, which is the bearing ring member that is the object of the manufacturing method of the present invention.
Figure 9:
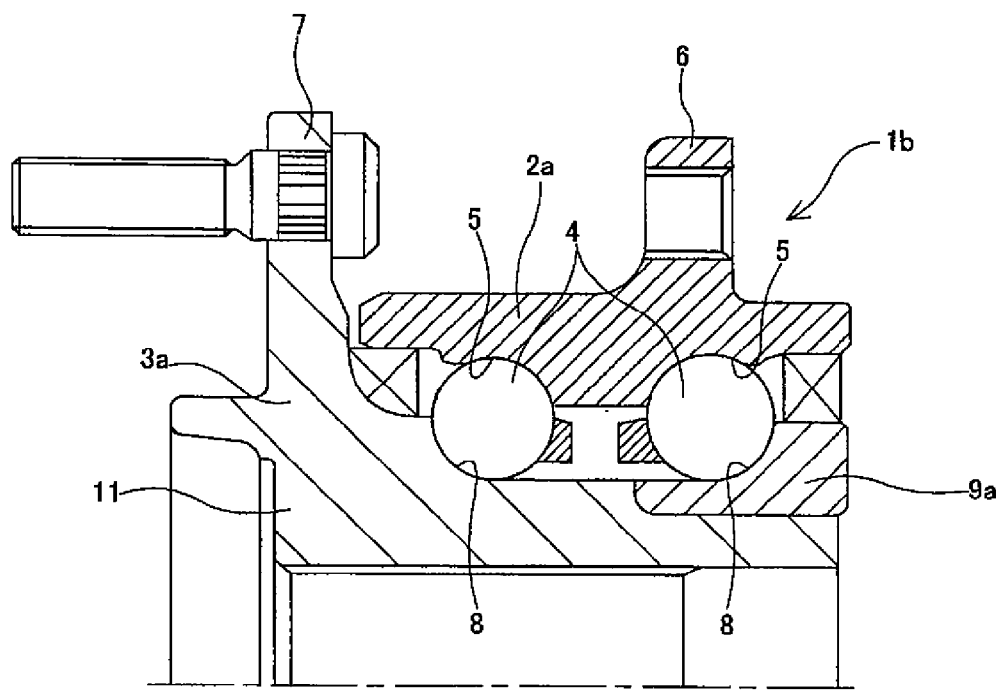
FIG. 9 is a cross-sectional drawing showing an example of an inner-ring rotation type rolling bearing unit for wheel support for a drive wheel that comprises an outer ring, which is the bearing ring member that is the object of the manufacturing method of the present invention.
Figure 10:
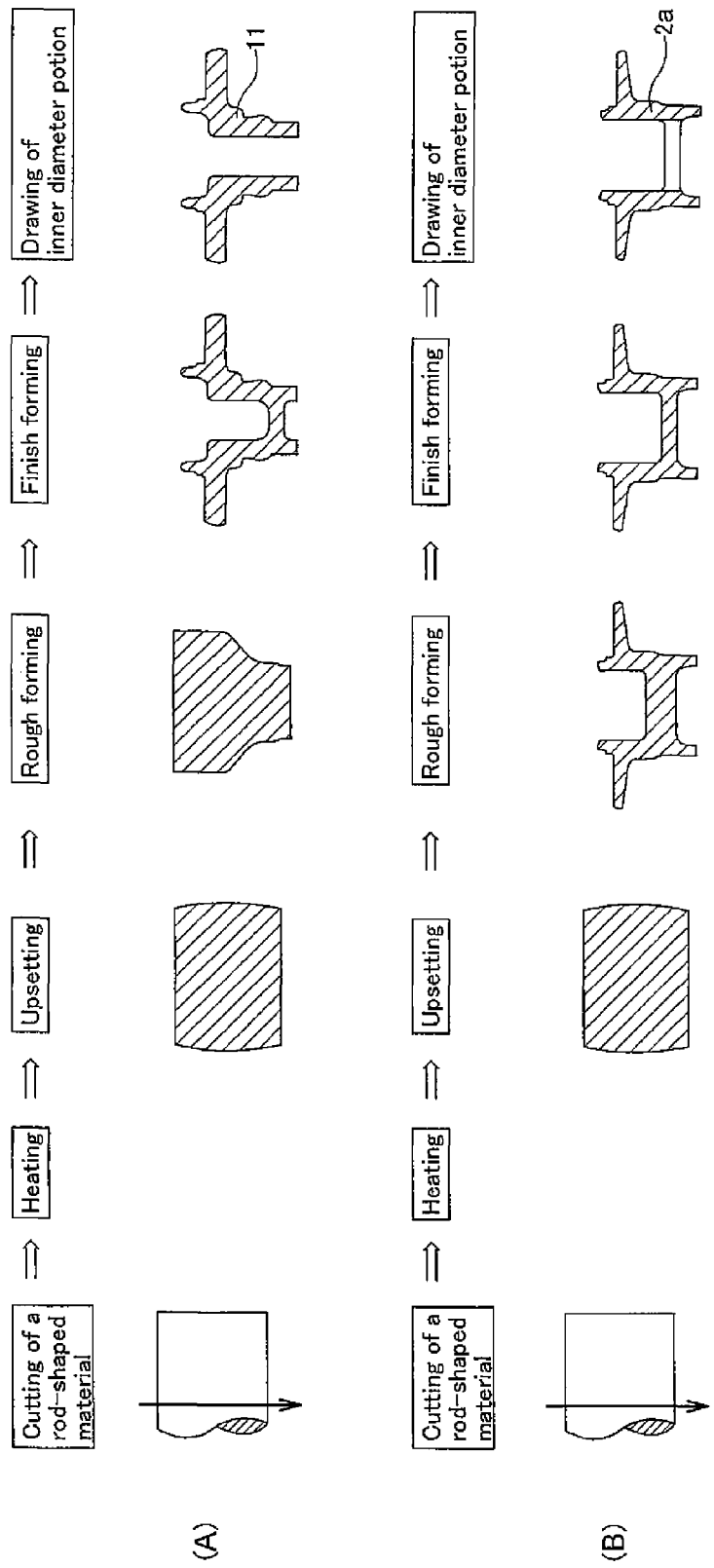
FIG. 10 shows cross-sectional drawings of the processing steps of two examples of a prior known manufacturing method for a bearing ring member.
Figure 11:
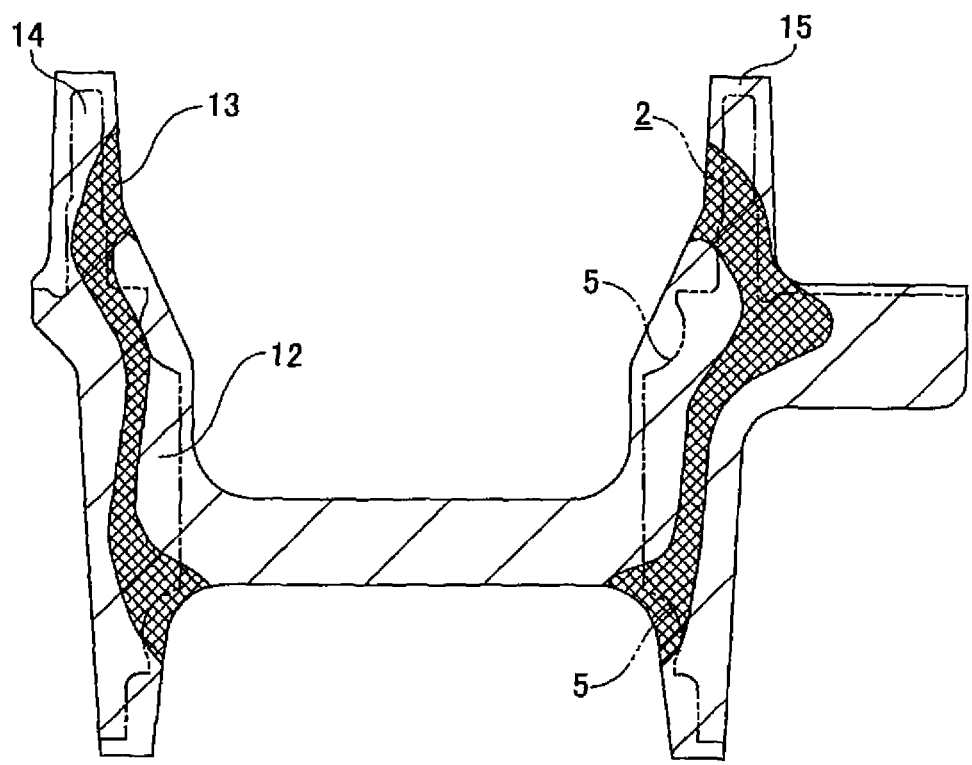
FIG. 11 is a cross-sectional drawing showing the distribution of the metal material of the circular column shaped portion near the center, the metal material of the middle cylindrical portion and the metal material of the cylindrical portion near the outer diameter of a later stage intermediate member that was made using a prior manufacturing method.
Figure 12:
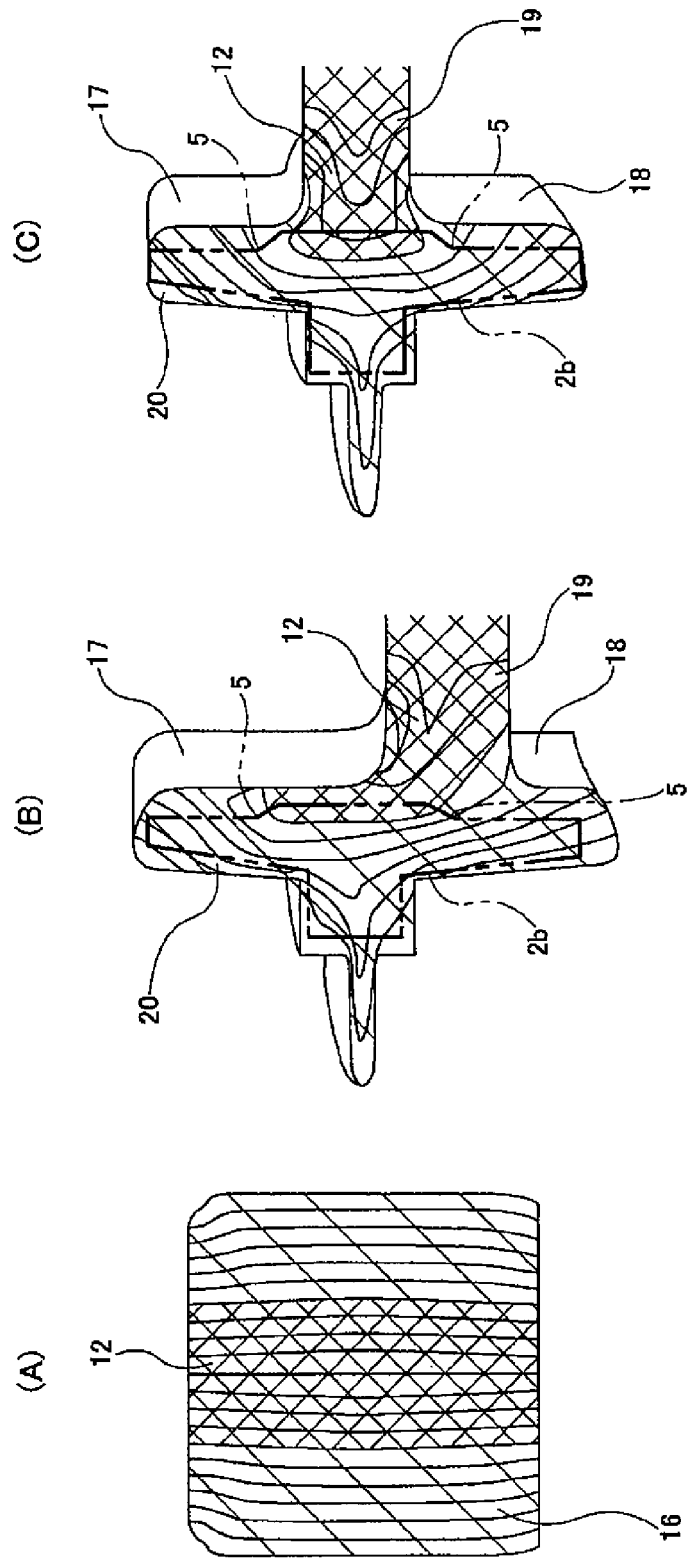
FIG. 12 is a drawing for explaining a different example of a prior manufacturing method, where (A) shows a cross section of raw material, (B) shows a cross section of intermediate member when the formation position of a partitioning section is not improved, and (C) shows a cross section of intermediate member when the formation position of a partitioning section has been improved.

The explanation above centered mainly on the case in which the manufacturing method for a bearing ring member of the present invention was applied to manufacturing the outer ring 2, 2a of an inner-ring rotating type of rolling bearing unit 1, 1b for wheel support such as shown in FIGS. 7 and 9. However, the manufacturing method of the present invention can also be applied to the case of manufacturing a hub 10 of an outer-ring rotating type of rolling bearing unit 1a for wheel support such as shown in FIG. 8 as long as the support flange 7a is located in a suitable location in the axial direction (located further to the right than in FIG. 8).

What is claimed is:

1. A manufacturing method for a bearing ring member comprising a cylindrical member having an inner peripheral surface and an outer peripheral surface, a double-row of back-to-back arrangement outer-ring raceways at two locations in an axial direction of the cylindrical member around the inner peripheral surface, and an outward facing flange around the outer peripheral surface, the method comprising:

performing an upsetting process to compress a circular column shaped metal raw material in an axial direction thereof to obtain a preliminary stage intermediate member having two ends in an axial direction and a middle section therebetween in the axial direction, the middle section having an outer diameter that is greater than outer diameters of the ends;

surrounding the preliminary stage intermediate member with dies having a flange formation space;

pressing the preliminary stage intermediate member from both of the ends thereof in the axial direction with punches to plastically deform the preliminary stage intermediate member such that each of the ends in the axial direction are formed into cylindrical sections each having an outer peripheral surface and an inner surface shape that fits an outer surface shape of the punches; and forming the outward facing flange of the bearing ring member with the flange formation space of the dies to obtain a later stage intermediate member;

wherein the metal raw material has a volume that is larger than that necessary for forming the later stage intermediate member, the dies comprise a stationary die and a movable die, the stationary die has a tip end surface and is fixed around one of the punches, the movable die has a tip end surface and is located around another of the punches such that it applies an elastic force in a direction toward the stationary die, the tip end surface of the movable die and the tip end surface of the stationary die face each other, and during the pressing step the punches compress the preliminary stage intermediate member from both of the ends thereof in the axial direction thereof causing the metal raw material of the preliminary stage intermediate member to fill into a cavity that is surrounded by the stationary and movable dies and both of the punches, after which the metal raw material presses the movable die causing the movable die to move away from the stationary die against the elastic force such that an extra portion of the metal raw material moves into a space that occurs between the tip end surfaces of the stationary and movable dies.

2. The manufacturing method of claim 1, wherein:

the pressing step is performed with a forward-backward extrusion process that compresses the preliminary stage intermediate member in a direction such that center portions of end surfaces defined by the ends thereof are moved toward each other to obtain a second preliminary stage intermediate member that comprises a first circular concave section that has an inner surface shape, a depth, and a bottom surface and opens into the end surface at one of the ends of the preliminary stage intermediate member, a second circular concave section that has an inner surface shape, a depth, and a bottom surface and opens into the end surface at the other of the ends of the preliminary stage intermediate member, and a partitioning section that is located between the bottom surfaces of the first and second circular concave sections; and during the forming step the second preliminary stage intermediate member is pressed between tip end surfaces of the punches such that the partitioning section is compressed without changing the depth or the inner surface shape of the first circular concave section and the metal raw material moves outward in a radial direction of the second preliminary stage intermediate member and forming the outward facing flange to obtain the later stage intermediate member.

3. The manufacturing method of claim 2 wherein the first circular concave section has a stepped cylindrical shape comprising first and second portions that are continuous at a stepped section therebetween, the first portion has an inner diameter and opens into the end surface of the one end, and the second portion has an inner diameter that is smaller than the inner diameter of the first portion.

4. The manufacturing method of claim 2, wherein after the later stage intermediate member is formed by plastically deforming the preliminary stage intermediate member between the stationary and movable dies and the punches, the method further comprises punching and removing the partitioning section.

5. The manufacturing method of claim 1, wherein during the pressing step the preliminary stage intermediate member is pressed between tip end surfaces of the punches, a center portion of the preliminary stage intermediate member is compressed in a radial direction of the preliminary stage intermediate member and the metal raw material moves outward in the radial direction, a first circular concave section is formed that has a bottom surface and opens into the end surface at one of the ends of the preliminary stage intermediate member, a second circular concave section is formed that has a bottom surface and opens into the end surface of the other of the ends of the preliminary stage intermediate member, a partitioning section is formed that is located between the bottom surfaces of the first and second circular concave sections, and the outward facing flange of the later stage intermediate member is obtained.

6. The manufacturing method of claim 5, wherein after the later stage intermediate member is formed by plastically deforming the preliminary stage intermediate member between the stationary and movable dies and the punches, the method further comprises punching and removing the partitioning section.

7. The manufacturing method of claim 5 wherein the first circular concave section has a stepped cylindrical shape comprising first and second portions that are continuous at a stepped section therebetween, the first portion has an inner diameter and opens into the end surface of the one end, and the second portion has an inner diameter that is smaller than the inner diameter of the first portion.

8. The manufacturing method of claim 1, further comprising:
forming a post-preliminary stage intermediate member by plastically deforming the preliminary stage intermediate member between the stationary and movable dies and the punches, whereby burrs are formed on the outward facing flange that correspond to the space between the tip end surfaces of the stationary and movable dies and that protrude outward in the radial direction from the outer peripheral surface; and then punching out and removing the burrs to obtain the later stage intermediate member.

* * * * *